US008799288B2

(12) United States Patent
Holzgrafe et al.

(10) Patent No.: US 8,799,288 B2
(45) Date of Patent: *Aug. 5, 2014

(54) SYSTEM AND METHOD FOR AUTOMATIC ANTHOLOGY CREATION USING DOCUMENT ASPECTS

(75) Inventors: Richard Holzgrafe, San Jose, CA (US); Tom Santos, San Jose, CA (US); Christopher Warnock, Los Altos, CA (US)

(73) Assignee: Ebrary, Palo Alto, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/286,075

(22) Filed: Oct. 31, 2011

(65) Prior Publication Data

US 2012/0047141 A1 Feb. 23, 2012

Related U.S. Application Data

(63) Continuation of application No. 12/945,710, filed on Nov. 12, 2010, now Pat. No. 8,069,174, which is a continuation of application No. 11/355,546, filed on Feb. 15, 2006, now Pat. No. 7,840,564.

(60) Provisional application No. 60/654,025, filed on Feb. 16, 2005.

(51) Int. Cl.
*G06F 7/00* (2006.01)
(52) U.S. Cl.
USPC .......... 707/738; 707/602; 707/608; 707/708; 707/771
(58) Field of Classification Search
USPC .................. 707/602, 608, 708, 738, 771
See application file for complete search history.

(56) References Cited

U.S. PATENT DOCUMENTS

| 4,404,649 A | 9/1983 | Nunley et al. |
| 4,941,170 A | 7/1990 | Herbst |
| 5,068,888 A | 11/1991 | Scherk et al. |
| 5,196,943 A | 3/1993 | Hersee et al. |
| 5,237,157 A | 8/1993 | Kaplan |
| 5,237,673 A | 8/1993 | Orbits et al. |
| 5,247,575 A | 9/1993 | Sprague et al. |

(Continued)

FOREIGN PATENT DOCUMENTS

| EP | 0881592 B1 | 10/2002 |
| EP | 1284461 A1 | 2/2003 |

(Continued)

OTHER PUBLICATIONS

"Jar—The Java Archive Tool" Sun Microsystems as taken from—http://web.archive.org/webl20030418074845/http://java.sun.com/j2se/1.4.2/docs/tooldocs/windows/jar.html (web archive from Apr. 18, 2003).*

(Continued)

*Primary Examiner* — Hosain Alam
*Assistant Examiner* — Bruce Witzenburg
(74) *Attorney, Agent, or Firm* — Michael A. Glenn; Perkins Coie LLP

(57) ABSTRACT

A generic and expandable document aspect system and method for searching, browsing, presenting, and interacting with data assembled from document contents and related external data is provided. New varieties of document aspects are added to existing installations and can be accessed by users without requiring upgrades to server or clients, for example by using plug-in technology.

30 Claims, 3 Drawing Sheets

(56) References Cited

U.S. PATENT DOCUMENTS

| | | |
|---|---|---|
| 5,291,405 A | 3/1994 | Kohari |
| 5,295,181 A | 3/1994 | Kuo |
| 5,307,452 A | 4/1994 | Hahn et al. |
| 5,327,265 A | 7/1994 | McDonald |
| 5,421,779 A | 6/1995 | Castro |
| 5,444,779 A | 8/1995 | Daniele |
| 5,465,299 A | 11/1995 | Matsumoto et al. |
| 5,486,686 A | 1/1996 | Zdybel et al. |
| 5,509,074 A | 4/1996 | Choudhury et al. |
| 5,513,013 A | 4/1996 | Kuo |
| 5,532,920 A | 7/1996 | Hartrick et al. |
| 5,546,528 A | 8/1996 | Johnston |
| 5,592,549 A | 1/1997 | Nagel et al. |
| 5,598,279 A | 1/1997 | Ishii et al. |
| 5,619,247 A | 4/1997 | Russo |
| 5,625,711 A | 4/1997 | Nicholson et al. |
| 5,629,980 A | 5/1997 | Stefik et al. |
| 5,629,981 A | 5/1997 | Nerlikar |
| 5,643,064 A | 7/1997 | Grinderslev et al. |
| 5,664,109 A | 9/1997 | Johnson et al. |
| 5,673,316 A | 9/1997 | Auerbach et al. |
| 5,680,479 A | 10/1997 | Wang et al. |
| 5,696,841 A | 12/1997 | Nakatsuka |
| 5,701,500 A | 12/1997 | Ikeo et al. |
| 5,729,637 A | 3/1998 | Nicholson et al. |
| 5,737,599 A | 4/1998 | Rowe et al. |
| 5,754,308 A | 5/1998 | Lopresti et al. |
| 5,781,785 A | 7/1998 | Rowe et al. |
| 5,790,793 A | 8/1998 | Higley |
| 5,802,518 A | 9/1998 | Karaev et al. |
| 5,819,092 A | 10/1998 | Ferguson et al. |
| 5,819,301 A | 10/1998 | Rowe et al. |
| 5,832,530 A | 11/1998 | Paknad et al. |
| 5,835,530 A | 11/1998 | Hawkes |
| 5,848,184 A | 12/1998 | Taylor et al. |
| 5,860,074 A | 1/1999 | Rowe et al. |
| 5,881,230 A | 3/1999 | Christensen et al. |
| 5,892,900 A | 4/1999 | Ginter et al. |
| 5,930,813 A | 7/1999 | Padgeett |
| 5,933,498 A | 8/1999 | Schneck et al. |
| 5,949,555 A | 9/1999 | Sakai et al. |
| 5,982,956 A | 11/1999 | Lahmi |
| 5,987,480 A | 11/1999 | Donohue et al. |
| 5,991,780 A | 11/1999 | Rivette et al. |
| 5,999,649 A | 12/1999 | Nicholson et al. |
| 6,006,240 A | 12/1999 | Handley |
| 6,012,083 A | 1/2000 | Savitzky et al. |
| 6,041,316 A | 3/2000 | Allen |
| 6,047,377 A | 4/2000 | Gong |
| 6,049,339 A | 4/2000 | Schiller et al. |
| 6,070,158 A | 5/2000 | Kirsch et al. |
| 6,119,124 A | 9/2000 | Broder et al. |
| 6,134,552 A | 10/2000 | Fritz et al. |
| 6,157,924 A | 12/2000 | Austin |
| 6,185,684 B1 | 2/2001 | Pravetz et al. |
| 6,192,165 B1 | 2/2001 | Irons |
| 6,205,456 B1 | 3/2001 | Nakao |
| 6,212,530 B1 | 4/2001 | Kadlec |
| 6,272,488 B1 | 8/2001 | Chang et al. |
| 6,282,653 B1 | 8/2001 | Berstis et al. |
| 6,289,450 B1 | 9/2001 | Pensak et al. |
| 6,289,462 B1 | 9/2001 | McNabb et al. |
| 6,321,256 B1 | 11/2001 | Himmel et al. |
| 6,324,265 B1 | 11/2001 | Christie et al. |
| 6,327,600 B1 | 12/2001 | Satoh et al. |
| 6,345,279 B1 | 2/2002 | Li et al. |
| 6,356,936 B1 | 3/2002 | Donoho et al. |
| 6,357,010 B1 | 3/2002 | Viets et al. |
| 6,363,376 B1 * | 3/2002 | Wiens et al. ................ 1/1 |
| 6,385,350 B1 | 5/2002 | Nicholson et al. |
| 6,389,541 B1 | 5/2002 | Patterson |
| 6,446,068 B1 | 9/2002 | Kortge |
| 6,449,718 B1 | 9/2002 | Rucklidge et al. |
| 6,493,763 B1 | 12/2002 | Suzuki |
| 6,516,337 B1 | 2/2003 | Tripp et al. |
| 6,523,026 B1 * | 2/2003 | Gillis ................ 1/1 |
| 6,565,611 B1 | 5/2003 | Wilcox et al. |
| 6,606,613 B1 | 8/2003 | Altschuler et al. |
| 6,629,097 B1 | 9/2003 | Keith |
| 6,640,010 B2 | 10/2003 | Seeger et al. |
| 6,732,090 B2 | 5/2004 | Shanahan et al. |
| 6,810,376 B1 | 10/2004 | Guan et al. |
| 6,870,547 B1 | 3/2005 | Crosby et al. |
| 6,920,610 B1 | 7/2005 | Lawton et al. |
| 6,931,534 B1 | 8/2005 | Jandel et al. |
| 6,988,124 B2 | 1/2006 | Douceur et al. |
| 7,069,451 B1 | 6/2006 | Ginter et al. |
| 7,079,278 B2 | 7/2006 | Sato |
| 7,110,126 B1 | 9/2006 | Lapstun et al. |
| 7,130,831 B2 | 10/2006 | Howard et al. |
| 7,133,845 B1 | 11/2006 | Ginter et al. |
| 7,290,285 B2 | 10/2007 | Mccurdy et al. |
| 7,536,561 B2 * | 5/2009 | Warnock et al. ........... 713/193 |
| 2002/0042793 A1 | 4/2002 | Choi |
| 2002/0065857 A1 * | 5/2002 | Michalewicz et al. ....... 707/532 |
| 2002/0138528 A1 | 9/2002 | Gong et al. |
| 2002/0143807 A1 | 10/2002 | Komatsu |
| 2003/0033288 A1 | 2/2003 | Shanahan et al. |
| 2003/0037094 A1 | 2/2003 | Douceur et al. |
| 2003/0037181 A1 | 2/2003 | Freed et al. |
| 2003/0061200 A1 | 3/2003 | Hubert et al. |
| 2003/0185448 A1 | 10/2003 | Seeger et al. |
| 2004/0030680 A1 | 2/2004 | Veit |
| 2004/0030741 A1 | 2/2004 | Wolton et al. |
| 2004/0049728 A1 * | 3/2004 | Langford ................ 715/501.1 |
| 2004/0133544 A1 | 7/2004 | Kiessig et al. |
| 2004/0133545 A1 | 7/2004 | Kiessig et al. |
| 2004/0133588 A1 | 7/2004 | Kiessig et al. |
| 2004/0133589 A1 | 7/2004 | Kiessig et al. |
| 2004/0205448 A1 | 10/2004 | Grefenstette et al. |
| 2004/0239681 A1 | 12/2004 | Robotham et al. |
| 2005/0022114 A1 | 1/2005 | Shanahan et al. |
| 2005/0044487 A1 | 2/2005 | Bellegarda et al. |
| 2007/0097959 A1 | 5/2007 | Taylor |
| 2011/0060740 A1 | 3/2011 | Holzgrafe et al. |

FOREIGN PATENT DOCUMENTS

| | | |
|---|---|---|
| EP | 0881591 B1 | 9/2003 |
| JP | 2001175807 | 6/2001 |
| WO | WO-9627155 | 9/1996 |
| WO | WO-9842098 | 9/1998 |
| WO | WO-9905618 | 2/1999 |
| WO | WO-9939286 | 8/1999 |
| WO | WO-0120596 A1 | 3/2001 |
| WO | WO-0157711 A1 | 8/2001 |
| WO | WO-0241170 A2 | 5/2002 |
| WO | WO-2004051555 A2 | 6/2004 |
| WO | WO2005062192 A1 | 7/2005 |

OTHER PUBLICATIONS

"Jar—The Java Archive Tool", Sun Microsystems, Retrieved from website on Apr. 18, 2003: http://web.archive.org/web/20030418074845/http://java.sun.com/j2se/1.4.2/docs/tooldocs/windows/jar.html, 2002, 7 pages.

Bartal, "Probabilistic Approximation of Metric Spaces and its Algorithmic Applications", FOCS Proceedings of the 37th Annual Symposium on Foundations of Computer Science, IEEE, Abstract, ISSN 0272-5428, Washington DC, Oct. 1996, pp. 2-3.

Carchiolo, V. et al., "Improving WEB usability by categorizing information", Proc. Int'l Conf. on Web Intelligence, Piscataway, NJ, Oct. 2003, pp. 146-152.

Cattoni, et al., "Geometric Layout Analysis Techniques for Document Image Understanding", Review, ITC-IRST Technical Report #9703-09, Trento, Italy, XP002229195, Feb. 1998, pp. 1-68.

Chen, Liren et al., "WebMate: a personal agent for browsing and searching", Proc. of the 2nd Int'l Conf. on Autonomous Agents, May 1998, pp. 132-139.

Chen, Yan-Min et al., "Multi-Document Summarization Based on Lexical Chains", Proceedings of 2005 International Conference on Machine Learning and Cybernetics, IEEE, Piscataway, NJ, USA, Aug. 2005, 1 page.

(56) References Cited

OTHER PUBLICATIONS

Embley, D.W. et al., "A Conceptual-Modeling Approach to Extracting Data from the Web", Conceptual Modeling—ER'98, 17th International Conference on Conceptual Modeling, Proceedings, 17th International Conference on Conceptual Modeling, Proceedings Springer-Verlag, Berlin, Germany, Nov. 1998, pp. 78-91.

Embley, D.W. et al., "Conceptual-Model-Based Data Extraction from Multiple-Record Web Pages", Data & Knowledge Engineering, vol. 31, No. 3, Elsevier, Netherlands, Nov. 1999, pp. 227-251.

Estievenart, F. et al., "A Tool-Supported Method to Extract Data and Schema from Web Sites", Proceedings Fifth IEEE International Workshop on Web Site Evolution Theme, Architecture, IEEE Comput. Soc, Los Alamitos, CA, USA, Sep. 2003, pp. 3-11.

Figa, E. et al., "Lexical Inference Mechanisms for Text Understanding and Classification", Proceedings of the 66th ASIST Annual Meeting, Humanizing Information Technology: From Ideas to Bits and Back, ASIST 2003, Information Today, Inc., Medford, NJ, USA, Oct. 2003, pp. 165-173.

Fujisawa, H. et al., "Automatically Organizing Document Bases Using Document Understanding Techniques", Future Databases, Proceedings of the Second Far-East Workshop on Future Database Systems, World Scientific, Singapore, Apr. 1992, pp. 244-253.

Keshi, I. et al., "A Knowledge-Based Framework in an Intelligent Assistant System for Making Documents", Future Generation Computer Systems, vol. 5, No. 1, Netherlands, Aug. 1989, pp. 51-58.

Knoll, A. et al., "An Integrated Approach to Semantic Evaluation and Content-Based Retrieval of Multimedia Documents", Research and Advanced Technology for Digital Libraries, Second European Conference, ECDL'98, Proceedings, Springer-Verlag, Berlin, Germany, Sep. 1998, pp. 409-428.

Lin, Chuan-Jie et al., "Description of Preliminary Results to TREC-8 QA Task", Information Technology: Eighth Text Retrieval Conference, TREC-8, NIST SP 500-246, NIST, Gaithersburg, MD, USA, Nov. 1999, pp. 507-512.

Mani, I. et al., "Recent developments in text summarization", Proc. of the 2001 ACM CIKM10th Int'l Conf. on Information and Knowledge Management, Atlanta, GA, Nov. 5-10, 2001, 2001, pp. 529-531.

Mouri, T. et al., "Extracting New Topic Contents from Hidden Web Sites", Proceedings ITCC 2004, International Conference on Information Technology: Coding and Computing, IEEE Comput. Soc., vol. 1, Los Alamitos, CA, USA, Apr. 2004, pp. 314-319.

Parodi, P. et al., "Efficient and Flexible Text Extraction from Document Pages", International Journal on Document Analysis and Recognition, vol. 2, No. 2-3, Springer-Verlag, Germany, Dec. 1999, pp. 67-79.

Song, W. et al., "A semantic similarity approach to electronic document modeling and integration", Proc. of the 1st Int'l Web Information Systems Engineering Conference on Hong Kong, Los Alamitos, CA, Jun. 2000, pp. 116-124.

Srihari, S.N. et al., "Forensic Handwritten Document Retrieval System", Proceedings First Workshop on Document Image Analysis for Libraries, IEEE Comput. Soc, Los Alamitos, CA, USA, Jan. 2004, pp. 188-194.

Wang, Guoren et al., "Design and Implementation of a Semantic Document Management System", Information Technology Journal, vol. 4, No. 1, Pakistan, Jan. 2005, pp. 21-31.

Zamir, Oren et al., "Grouper: a dynamic clustering interface to Web search results", Proc. of the 8th Int'l Conf. on World Wide Web, Toronto, Canada, May 1999, pp. 1361-1374.

Zhang, et al., "BIRCH: An Efficient Data Clustering Method for Very Large Databases", ACM SIGMOD Record, Prceedings of the 1996 ACM SIGMOD International Conference on Management of Data, ACM Press, vol. 25, Issue 2, New York, ISSN 0163-5808, Jun. 1996, pp. 103-114.

Broder, Andrei Z. , "Identifying and Filtering Near-Duplicate Documents", Lecture Notes in Computer Science/Computational Science (CPAIOR 2011), Springer, DE, XP002462003, Jun. 21, 2000, 10 pages.

\* cited by examiner

SYSTEM AND METHOD FOR AUTOMATIC ANTHOLOGY CREATION USING DOCUMENT ASPECTS

CROSS-REFERENCE TO RELATED APPLICATIONS

This application is a continuation of U.S. patent application Ser. No. 12/945,710, filed Nov. 12, 2010 now U.S. Pat. No. 8,069,174, which is currently allowed, which is a continuation of U.S. patent application Ser. No. 11/355,546, filed Feb. 15, 2006, U.S. Pat. No. 7,840,564, which claims priority to U.S. Provisional Patent Application Ser. No. 60/654,025, filed on Feb. 16, 2005, each of which is incorporated herein in its entirety by this reference thereto.

BACKGROUND OF THE INVENTION

1. Technical Field

The invention relates to searching and browsing media objects. More particularly, the invention relates to a document aspect system and method for adding new levels of granularity for searching and browsing media objects and for adding new document aspects without requiring system upgrades.

2. Description of the Prior Art

EBRARY (herein referred to as ebrary) currently has a hierarchy of document containers and contents: Server>Subject>Document>Page>Word. Searches can be performed within a subject or within a document; search results are presented as lists of documents or, implicitly, as lists of pages within a document, respectively. No changes or additions to this hierarchy can be made without upgrading both the server and the client. Although, some functionality can be added to the server without changing the client, it is along the lines of obtaining finer-granularity search results. Opening such a result in the existing client still renders an unchanged Document>Page>Word environment for page-browsing and document-searching.

It would be beneficial to provide a system and method that can handle changes and/or additions to such hierarchy without upgrading both the server and the client.

Currently, ebrary's technique supports additional methods of viewing and browsing a document, such as tables of contents, annotations, and the subject and document indexes. However, such current methods of viewing and browsing documents are implemented as hard-coded special cases.

It would be advantageous to implement current methods of viewing and browsing documents, which are implemented as hard-coded special cases, as generic Document Aspects, for example Table of Contents.

Granularity refers to the levels of detail available to users for searching and browsing documents. Hereinbelow in Table A is a list of granularities that ebrary currently provides.

TABLE A

| | |
|---|---|
| Server | The set of documents offered by a single server. |
| Subject | Groups of related documents, organized hierarchically by subject. |
| Document | An individual document in its entirety. |
| Chapter | A named, contiguous portion of a document. Users are nominally able to search within chapters. Searches are performed at the word level and users are provided with a list of the most relevant chapters for their search. |

It would be advantageous to provide an unlimited variety of granularities at all levels that can be useful to system users, resulting in a better user experience as well as benefits to document and technology suppliers at all tiers.

It would further be advantageous to at least provide a collections granularity that can span multiple servers; an articles granularity which may be smaller than documents but may also be larger than pages and where articles also can span multiple documents; and a sidebars granularity where sidebars can be smaller than pages but can be larger than words; and so on.

Current ebrary search results simply list documents, i.e. no finer or coarser granularity is displayed.

It would be advantageous to provide a system and method that allows for finer granularity in search results, such as for example, displaying search results within a hierarchical framework.

SUMMARY OF THE INVENTION

A generic and expandable document aspect system and method for searching, browsing, presenting, and interacting with data assembled from document contents and related external data is provided. New varieties of document aspects are added to existing installations and can be accessed by users without requiring upgrades to server or clients, for example by using plug-in technology.

DETAILED DESCRIPTION OF THE INVENTION

Figure 1:
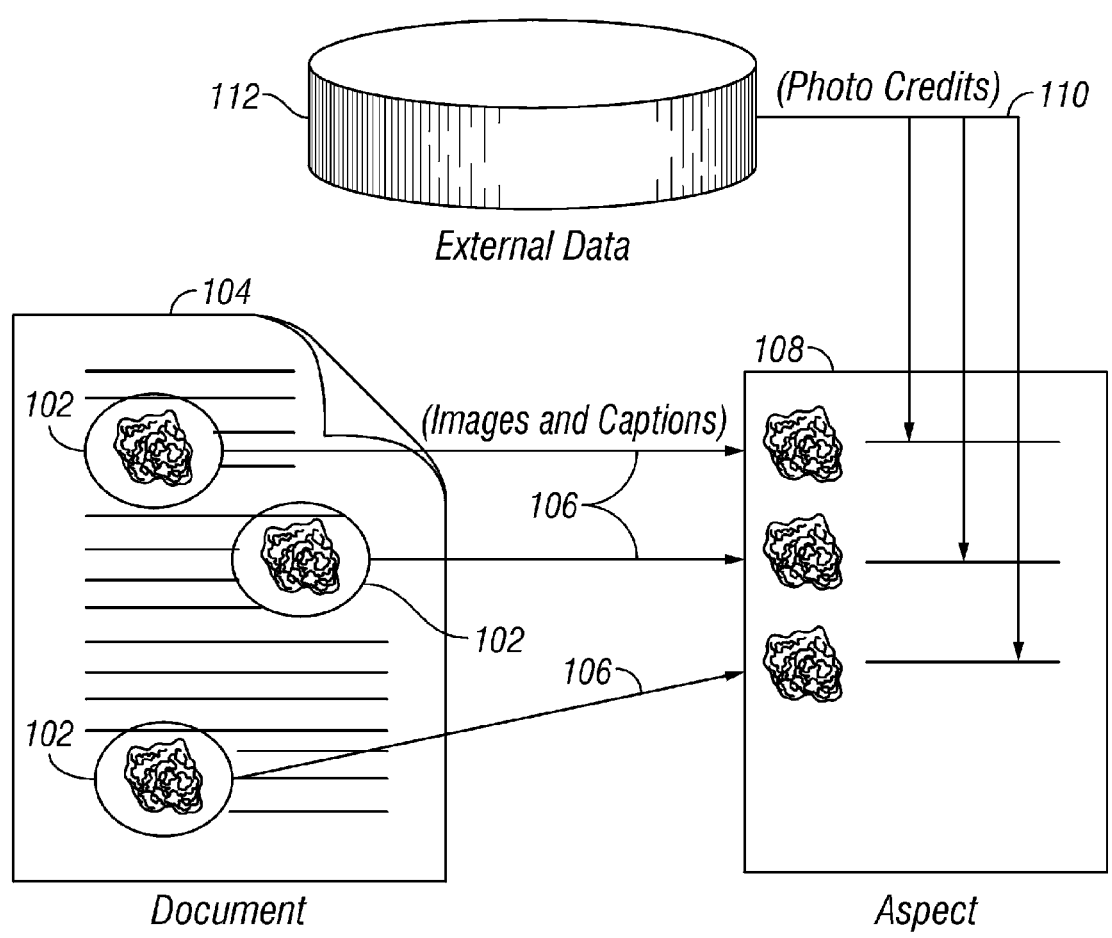
FIG. 1 is a schematic diagram showing a Document Aspect extraction process according to the invention.

A generic and expandable document aspect system and method for searching, browsing, presenting, and interacting with data assembled from document contents and related external data is provided. New varieties of document aspects are added to existing installations and can be accessed by users without requiring upgrades to server or clients, for example by using plug-in technology.

It should be appreciated that any use or description of a document as a holder of written information is by way of example only and is not meant to be limiting. A document is a type of object, such as for example a collection of data for an intended use, for example, a media document. It should be readily apparent that the meaning of document is clear to one skilled in the art for the manner of making and using the invention.

In one embodiment of the invention, a Document Aspect (DA) is a portion of a document's contents, where the portion is all and only those parts of the document that have something useful in common. An example is a Table of Contents, which is a list of chapter titles each associated with the page number of the first page of the chapter.

A Document Aspect module is a combination of software and storage that can extract a portion of a document's contents, store the extracted portion along with relevant metadata, and allow the extracted portion to be searched and retrieved. A Document Aspect instance is the data extracted from a particular document by a particular Document Aspect module. A Document Aspect descriptor describes the Document Aspect using a standard format, listing its names and labels, data formats, display and user interaction requirements, module invocation requirements, and so on.

Document Aspects allow electronic book technologies, products, and services, that serve libraries and publishing communities such as ebrary®, to extract, store, search, and display portions of documents as articles, endnotes, and tables or lists of contents by type, e.g. lists of illustrations, and so on. They enable new levels of granularity for searching, for display of search results, and for ease of finding and viewing relevant pages of documents.

One embodiment of the invention provides a Cross-Document Aspect, which is like a Document Aspect, but which is formed from the union of Document Aspects from multiple documents. For example, an article that is segmented across multiple issues of a journal can have a Cross-Document Aspect. Extracting such aspects might be a complex process however the results, i.e. the Cross-Document Aspect, is stored as a DA instance within each of the documents that contributed to the result.

In one embodiment of the invention, a Document Aspect framework is designed modularly and configured such that new DA modules are added and incorporated as needed. In one embodiment of the invention, such new DA modules are added to the server hosting the DA modules as server plug-ins. As such, client components are able to recognize and display any new Document Aspects associated with the appropriate new DA modules without any need for client upgrades or plug-ins.

An additional advantage of DAs is that they enable new granularities and hierarchies of data. By way of example, consider the following hierarchies: Subject>Document>Article>Section>Page and Subject>Document>Chapter>Page. It is readily apparent that Subject>Document>Article>Section>Page is different from Subject>Document>Chapter>Page and that the two hierarchies cannot be merged. However, with Document Aspects both can be made available with no need for merging and no need to enshrine either hierarchy as the official or only hierarchy.

An example of an extraction process according to one embodiment of the invention can be described with reference to FIG. 1. Embedded illustrations 102 in a document 104 are extracted 106 and are combined with extracted photo credits 110 from an external data source 112 to be used in a generated List of Illustrations Document Aspect 108.

Desiderata

This section discusses a number of features provided in various embodiments of the Document Aspect framework.

Easy Introduction of New Types

New kinds of Document Aspect are easy to introduce into servers that implement the Document Aspect framework.

Server Plug-in Modules.

Document Aspects are extracted from submitted documents. The term, extraction, can mean a variety of methods, including, but not limited to: reading a metadata file submitted along with the document; recognizing PDF entities, e.g. article threads; using heuristic techniques to identify entities such as illustrations, sidebars, and footnotes; aggregating aspects of individual documents into a multi-document instance, such as for example Subject Indexes built from Document Indexes; and user input such as for example anthology construction and editing.

Extraction is accomplished when the server invokes an extraction method. Such method is part of a Document Aspect module, is dynamically loaded, and knows how to extract a particular kind of data from a document or group of documents. New modules can be added to existing servers with no need to upgrade the server itself.

In one embodiment of the invention, extraction occurs under one or more trigger conditions. The extraction module specifies which conditions are acceptable triggers. Examples of triggers are as follows: a trigger can be document submission; a trigger can be a periodic spidering, i.e. re-examination, of the documents in the document repository; and yet another trigger can be user input, as when a user creates or edits an anthology, or annotates a document.

Flexible Storage.

In one embodiment of the invention, Document Aspect modules are formatted as jar files, containing java classes that implement the module along with any ancillary files. The jar file's manifest contains name-value pairs identifying the jar as a Document Aspect module and the jar contains an XML file containing the module's Document Aspect Descriptor.

The server spiders a specified area of its hard disk at startup, locating and loading each such jar file and building an internal list of descriptors. Clients can learn about any Document Aspect by retrieving the appropriate descriptor from the server.

Other storage mechanisms are possible, such as a database table containing the Document Aspect Descriptor data for each module. However, the self-contained jar offers great ease-of-use, maintenance, and installation benefits.

Forward-compatible Clients.

According to one embodiment of the invention, clients that are designed to handle Document Aspects are able to retrieve new kinds of aspect instances, display them sensibly to the user, and react to the user's input, without needing to be upgraded.

Example: A site installs a document server, such as for example ebrary's document server, and deploys a version 1.0 client to its users. A year later, a new "Table of Illustrations" DA is added to the server, and all documents are re-processed to extract lists of illustrations for each. When the user selects a document by using the version 1.0 client software, the client downloads a list of DA descriptors for all DA instances available for the document. A descriptor for the new "Table of Illustrations" DA is found in the list of DAs. From the descriptor, the client learns that the new DA is named "Table of Illustrations," that its name can be abbreviated as "Figs.", that the extracted data are in list format, and that each entry in the list consists of a text label, a page number, and a thumbnail image. The client therefore adds a tab labeled "Figs." to a tab panel; when the user clicks the Figs. tab to display the Table of Illustrations, the extracted data are downloaded and displayed as a list of thumbnail images and labels, i.e. captions. When the user clicks an item in the list, the associated page of the document is downloaded and displayed. It should be appreciated that the client software isn't limited to a particular type of software. As an example, the client software can be developed using Active-X control.

Figure 2:
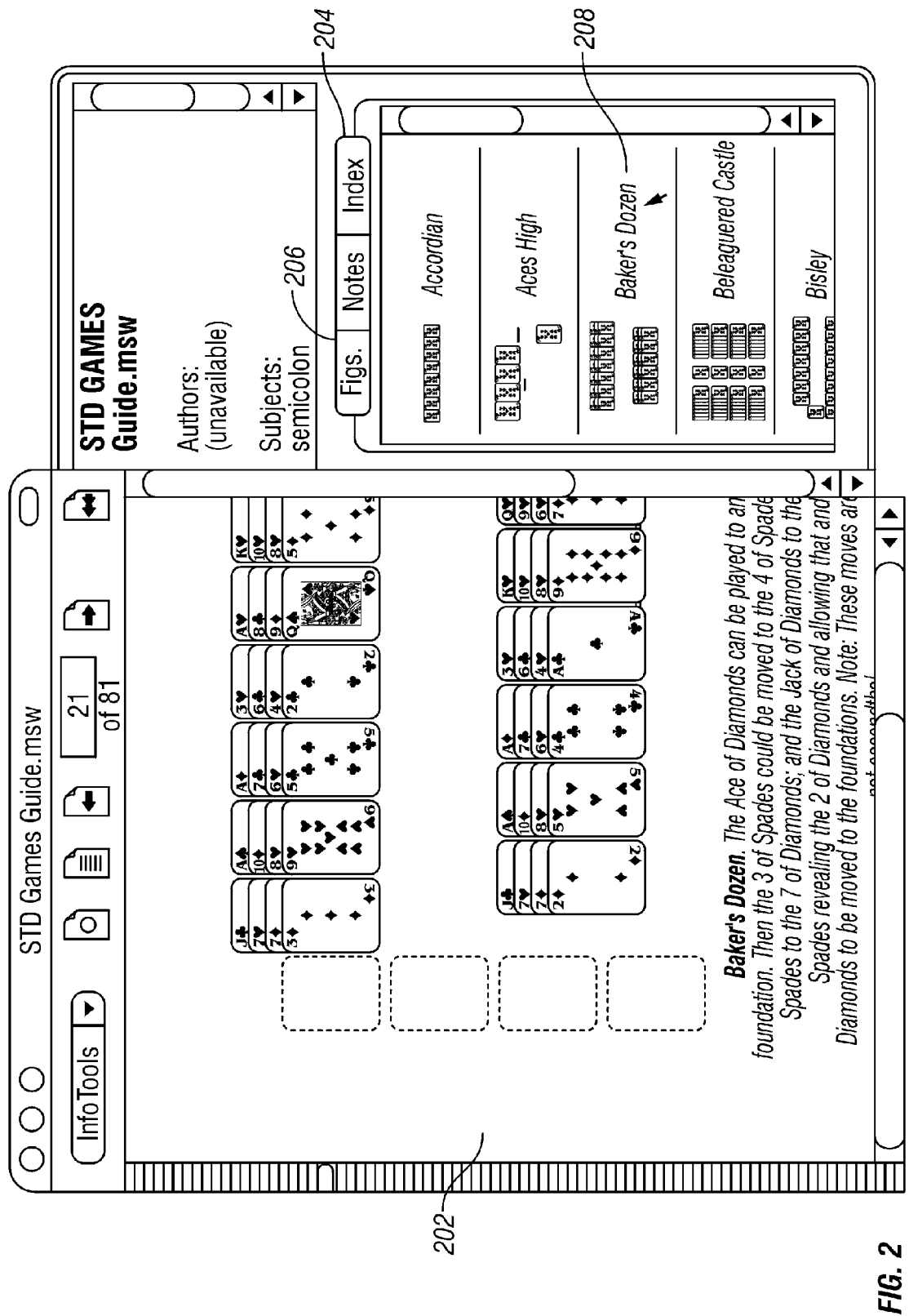
FIG. 2 is a client application display of a document aspect according to the invention.

An example implementation can be described with reference to FIG. 2, a client application display of a document aspect according to one embodiment of the invention. The main panel on the left shows part of a page of the document 202. The tab panel at the lower right shows several available Document Aspects for the document 204. The user has selected the Figs. tab 206 to display a list of illustrations, and has opened the item, Baker's Dozen 208, causing the application to display the document page where that illustration is found 202.

Search Features

Current ebrary search results simply list documents, i.e. no finer or coarser granularity is displayed. However, once a document is opened for viewing by a client, the list of pages on which the search terms were found is available to the client. Such information is made available to the user via Next and Previous buttons rather than as a list.

Hierarchical Search Results and Finer Granularity.

Document Aspects allow for finer granularity in search results. For example, a search might find terms within multiple articles in a document contained within a collection. The search results can be displayed hierarchically: Collections at the top level, with lists of documents within each collection, and with lists of articles within the documents. The user can select to view an entire document. In one embodiment of the invention, he is initially shown the first page of the document containing the search terms. Or, the user can select to view a particular article. In one embodiment of the invention, he is initially shown the first page of the article containing the search terms. The next- and previous-result buttons go to pages where the article contains more occurrences of the search terms. It is desirable for the granularity to be extended to the page level, displaying a list of pages under each Article, and for each page showing a few words of context surrounding an occurrence of a search term.

By way of example, fine-granularity search results include lists of articles, chapters, sections, illustrations, and so on.

Associated Metadata

In one embodiment of the invention, Document Aspect instances have metadata associated with them. For example, an article might have a list of authors or contributors; an illustration might have a photo credit and its own copyright; there might even be separate access permissions for some portions of a document.

Some metadata can be stored in a well-defined, standard format that a DA-aware server or client is able to recognize and interpret, such as access permissions and copyright notices. A DA-aware server is a document server that includes an implementation of a Document Aspect framework. Some metadata can be stored in the form of arbitrary key-value strings that can be displayed in a generic fashion. Following are some specific examples of arbitrary metadata key-value strings that can be displayed in a generic fashion:

Author: John Jacob Jingleheimer Smith
Publisher: Nonesuch Bookbinders, Inc.
Date of Publication: Feb. 30, 1881
Dedication: To my darling children In the examples hereinabove, the words in boldface are the keys, the words in plain face are the values. Regardless of the actual text of keys or values, i.e. that's the arbitrary part, the metadata can be displayed as shown above with keys in boldface and values in plain face. Other modes of display are possible, of course. The point is that neither the server nor the client software need to recognize the keys in order to sensibly display the metadata to the user. This is in contrast to a system that would be limited to specifically recognize certain keys, e.g. Author, but not others, e.g. Dedication, and would be able to display only the recognized keys.

Non-generic Types

In one embodiment of the invention, some types of Document Aspect may have hard-coded features or employ hard-coded presentation; that is, such features and presentation may not be possible to represent in a completely generic fashion. For example, consider Annotations, which, in one embodiment of the invention, are stored per-user and are created and edited by users, possibly using a more elaborate user interface than a standard DA. Such non-generic DAs can be hard-coded in the server and the clients, just as those features are today.

Alternate Embodiments

Add Documents

In one embodiment of the invention a submission system and method is provided. Preferably, a minimal document submission is performed as quickly as possible with refinements added later, in the background, and at a lower priority. More specifically, one can add documents to the server's collection, that is, make new documents available to users, quickly, by first doing the minimal necessary document processing, then performing the Document Aspect processing at a later time. Between the time when the basic, i.e. minimal necessary, processing is complete, and the time the DA processing is complete, users are able to access the document to view pages and perform basic searches, e.g. search for pages within the document, but would not be able to access any DA data for the document. After the DA processing is complete, the DA data would also be available. The reason for delaying the DA processing is to allow new documents to be added to the server as quickly as possible at times when many documents must be added, and to perform the DA processing at a later time when no new documents are pending.

Client Fetch

In one embodiment of the invention, a system and method is provided by which one can present document data to a user more quickly and reduce the load on the server by delaying the download of Document Aspect data until and unless the user expressly requests it, such as by clicking a tab or manipulating some user interface element, that causes Document Aspect data to be displayed.

In one embodiment of the invention, a DA-aware client asks for information about a document and requests the document's supported DAs. Herein, supported DAs means DAs that have produced instances for the particular document in question. The server's reply is a collection, such as a list, of DA descriptors. Each DA descriptor provides specific information, such as the DA's name, DA's short label, DA's data format, and the user interface paradigm. The user interface paradigm refers to whether the data is best displayed as a list, a table, an outline, a paragraph of text, etc. The client software selects and uses an appropriate user interface for displaying the data based on this portion of the Document Aspect Descriptor. The client uses the reply to populate a tab panel with a tab for each DA. In one embodiment, such tabs are along with tabs for hard-coded DA-like entities such as Notes. The contents represented by each tab are actual instance data for each DA. Such contents are fetched only if, and only when, the user clicks the respective tab to display its contents. Such fetching is referred to herein as a lazy fetch. Such lazy fetch entails a brief delay for the user, because the information to be displayed isn't pre-fetched and made immediately available. An ebrary prototype behaved in this fashion when displaying indexes and Tables of Contents, and its behavior was deemed acceptable. Because the user may not often need to see the contents of every DA, a lazy-fetch is advantageous as it can save a great deal of unnecessary network traffic and server requests.

Use Cases

Following in Table B is a list of entities that can be treated as Document Aspects, some of which are described in further detail hereinbelow. Such entities are by way of example only and are not meant to be limited. For example, the system and method provides for a Document Aspect for media, i.e. a Media Aspect. That is, for store instances of a particular media, when such media is open, the system and method provides a corresponding Aspect for the media.

TABLE B

| | |
|---|---|
| Server | The set of documents offered by a single server. |
| Collection | Arbitrary named subsets of a server's set of documents. |
| Subject | Groups of related documents, organized hierarchically by subject. |
| Document | An individual document in its entirety. |
| Chapter | A named, contiguous portion of a document. |
| Article | An ordered set of discontiguous portions of one or more documents. |
| Index | A list of words and common phrases found in a document, mapped to the pages on which they occur. |
| Sidebar | Separate blocks of text that occur on portions of pages. |
| Illustrations | A table of illustrations found within a document. |
| Footnotes | A list of footnotes found within a document. |
| Links | A list of Web links found within a document. |
| Glossary | Pages that contain Lists of words from the document, and their definitions. |
| Colophon | The colophon page of a document. |
| Copyright | A document's copyright or copyright page. |
| Anthology | An aggregation of portions of multiple documents. |

Table of Contents.

A Table of Contents (TOC) is a list of named subsets of a document. Each item in the list has a text label, is associated with a page number in the document, and can by implication be associated with a page range m-(n–1) where m is the first page of a chapter or section, and n is the first page of the next chapter or section in the list. The list can be hierarchical and can be displayed with a standard hierarchical list UI element. The item in the list can be selected. In one embodiment of the invention, when an item in the list is clicked or opened, the associated page of the document is displayed.

A Table of Contents, preferably displayed, is useful to an end user because it represents the document author's organization of the document in a sensible way, and can be used both to get an overview of the document contents and organization, and for quick access to the listed sections.

Document Index.

A Document Index is a list of significant words and phrases found within a document. Each item in the list has a text label, i.e. the indexed word or phrase, and is associated with an integer count-of-occurrences and a list of page numbers of pages on which the word or phrase occurs. The list can be displayed with a standard flat list or table UI element. When an item in the list is clicked or opened, the first associated page of the document is displayed, and occurrences of the item's label on the page are highlighted.

A Document Index display is useful to an end user because it can show the most common words and phrases, giving a clue as to the document's contents and true subject material, and can be used in lieu of standard search to find material of interest to the user. It is superior to standard search in two ways: (1) it is faster, since the search has already been performed and the server need not get involved, and (2) it prevents confusion due to misspellings and typos on the part of both the user and the document author.

Subject Index.

A Subject Index is a list created by merging the Document Indexes of every document contained within a given subject. Its format is similar to the Document Index but differs in that each item in a Subject Index also has an associated document identifier, i.e. DocID.

A Document Index is used as a more efficient form of searching within a document; a Subject Index is used as a more efficient way of searching for documents. Its display is identical to that of the Document Index, but opening an item yields a list of documents in which the indexed word or phrase can be found, rather than a page view.

Annotations.

Annotations may be a challenging task to implement as a Document Aspect, for several reasons. One reason is that annotations are stored per-user, not per-document, which may make it challenging to control. Another is that what may be considered a desirable UI for displaying annotations may not easily be representable by a generic UI element, because of involving not only images, but colored backgrounds. Yet another reason is that the UI for generating annotations is idiosyncratic, and could not be represented generically.

Articles.

Articles in newspapers and journals are composed of portions of pages, where the pages are not necessarily contiguous. In one embodiment of the invention, an Article DA lists all of the pages that contain portions of an article. The Article DA can also list which word ranges on each page that are part of the article. Further provided can be a Next Page in Aspect button and a corresponding Previous Page in Aspect button, allowing users to easily click through those pages, and only those pages, that comprise the article. In another embodiment of the invention, a feature is provided that allows users to select words or phrases in an article and to search for other occurrences within the article.

In one embodiment of the invention, a heuristic article extractor is provided. For example, PDF, by Adobe Systems Incorporated, includes an article-thread capability and an Article DA extracting articles by mining the articles from PDF files is provided.

Colophons.

A colophon object, such as a page, provides or lists details of a book's manufacture: its fonts, materials, art direction credits, and such. In one embodiment of the invention, a Colophon DA is provided that heuristically recognizes a colophon page from its layout, from its location within the document, such as near the front or back of a book, and from its contents.

Copyrights.

In one embodiment of the invention, a Copyright DA encapsulates copyright information in a fashion easy for a client to request, process, and display. In one embodiment of the invention, it heuristically recognizes a copyright page from its layout, from its location within the document, such as near the front or back of a book, and from its contents. In another embodiment of the invention, it encapsulates appropriate portions of a document's standard metadata.

Enhanced Table of Contents.

In one embodiment of the invention, a Document Aspect module contributes to an aggregate instance. Such feature can be used instead of having each module have its own separate storage and display mechanism. In this way, separate modules can all contribute to an enhanced Table of Contents by each adding entries for particular entities, such as: colophon, copyright, dedication, title page, bibliography, end notes, and so on.

Tables of Illustrations.

In one embodiment of the invention, a Table of Illustrations DA recognizes illustrations within a document, extracts labels by looking for short paragraphs of distinctive formatting below or beside each illustration, and formats the results or extracts as a list of labels, for example, labels associated with the page numbers on which the illustrations occur. In another embodiment of the invention, images are added as a generic capability for displaying DA items to the user and include each illustration in the list as a thumbnail icon.

Lists of Links.

In one embodiment of the invention, a List of Links DA extracts all links from a document and formats the links as a list. Such links can include internal links to pages within the document; external links to other documents available from local or remote document servers that host DAs; and external Web URLs. The user can click any link in the list to display the linked page, open a client window displaying the linked document, or open a Web browser to the linked URL.

Lists of Citations.

In one embodiment of the invention, a Citation DA extracts citations from a document and presents the citations in a list. A citation is a specification of another document quoted or referred to by a given document. Typically, such specification is characterized by some or all of such elements as the quoted or referred document's title, author(s), ISBN number, publisher, etc. In one embodiment of the invention, clicking an item in the list performs a search for documents matching the title, authors, etc.

Lists of Contributors.

In one embodiment of the invention, a Contributors DA extracts a list of article authors from a journal or anthology, and present the list to the user. Clicking a list item performs a search for other publications by that author.

Lists of Advertisers.

In one embodiment of the invention, an Advertisers DA extracts a list of advertisers from a journal, and present them to the user. Clicking an item can display the first page on which an ad from that advertiser occurs, and the Next and Previous buttons can take the user to prior or subsequent pages on which such ads occur.

Endnotes.

In one embodiment of the invention, an Endnotes DA recognizes the first page on which an endnote occurs and adds that page to the Enhanced Table of Contents. In an alternate embodiment of the invention, the Endnotes DA extracts the endnotes themselves. The endnotes can occur on a discontiguous set of pages, for example after each chapter, and the Endnotes DA presents the endnotes in a list for easy review by the user. In one embodiment of the invention, clicking an item displays the page on which the endnote was referenced, rather than the page on which the endnote itself occurs, because the user can read the text of the endnote in the DA display. Another embodiment of the invention provides different results determined from the user clicking different parts of an item so that the user chooses what to see, such as the page containing the endnote itself or the page that referenced it. That is, a listing of an endnote might quote a portion of the endnote and also show the page number that the endnote annotates. If the user clicks the page number portion of the display, that page, that is, the annotated page, is displayed. But if the user clicks the quoted portion of the endnote, then the page on which the complete endnote can be read is displayed.

Glossaries.

In one embodiment of the invention, the Glossary DA recognizes the first page of a glossary section and add that page to the Enhanced Table of Contents. In an alternate embodiment of the invention, the Glossary DA extracts and presents the actual contents of the glossary, so that the user need not flip pages to look up the meaning of a term, then flip back to the page where the puzzling term was encountered. Instead, the user can simply click the Glossary tab, presented in a separate panel from the page display, and scroll a bit to find the desired entry, while the page the user is reading remains visible.

Catalog Card.

In one embodiment of the invention, a Catalog Card DA lists the same or similar information that can be found on a library's catalog card for the document, such as Title, author, publisher, year of publication, etc. Clicking on various portions of the listing performs the appropriate document searches. For example, clicking on an author's name performs a search for other documents by that author.

Architecture Notes

Extraction

Extraction is the process of extracting part of the contents of a document or set of documents, formatting the extraction, and storing it in a repository, such as a database. It should be appreciated that such extraction modules and repository can be distributed in any manner and still be within the scope of the invention.

In one embodiment of the invention, extraction is accomplished by an Extraction Module, a piece of plug-in software that can easily be added to, or removed from, a document server without otherwise modifying the server.

Extraction is performed when an appropriate Trigger Event occurs. Acceptable triggers are listed in the DA descriptor. Possible triggers include, but are not limited to, document submission, periodic spidering, an administrator request, or a user request via a servlet. Here, periodic spidering means traversing the document repository in order to re-examine each document therein. A spidering can performed to allow newly-installed Document Aspect Modules to process documents already in the repository; this is distinguished from a document submission trigger, in which a newly-submitted document is processed by Document Aspect Modules that are already installed.

In one embodiment of the invention, modules conform to a standard API that allow the modules to request data from the server and to supply data, such as Document Aspect Instance data, to be stored by the server.

Storage

In one embodiment of the invention, DA data are stored by a host server in a database on the server. It should be appreciated that herein database can mean a literal database or can mean the server's collection of per-document data stored in a hierarchy of files on the hard disk. DA instance data are stored as a blob, i.e. a lump of data whose structure is undefined to the database, and the blob is associated with a document. Instance data associated with both a document and a user, such as annotations, are stored as a blob associated with the user. Here, the blob specifies the affected document.

Figure 3:
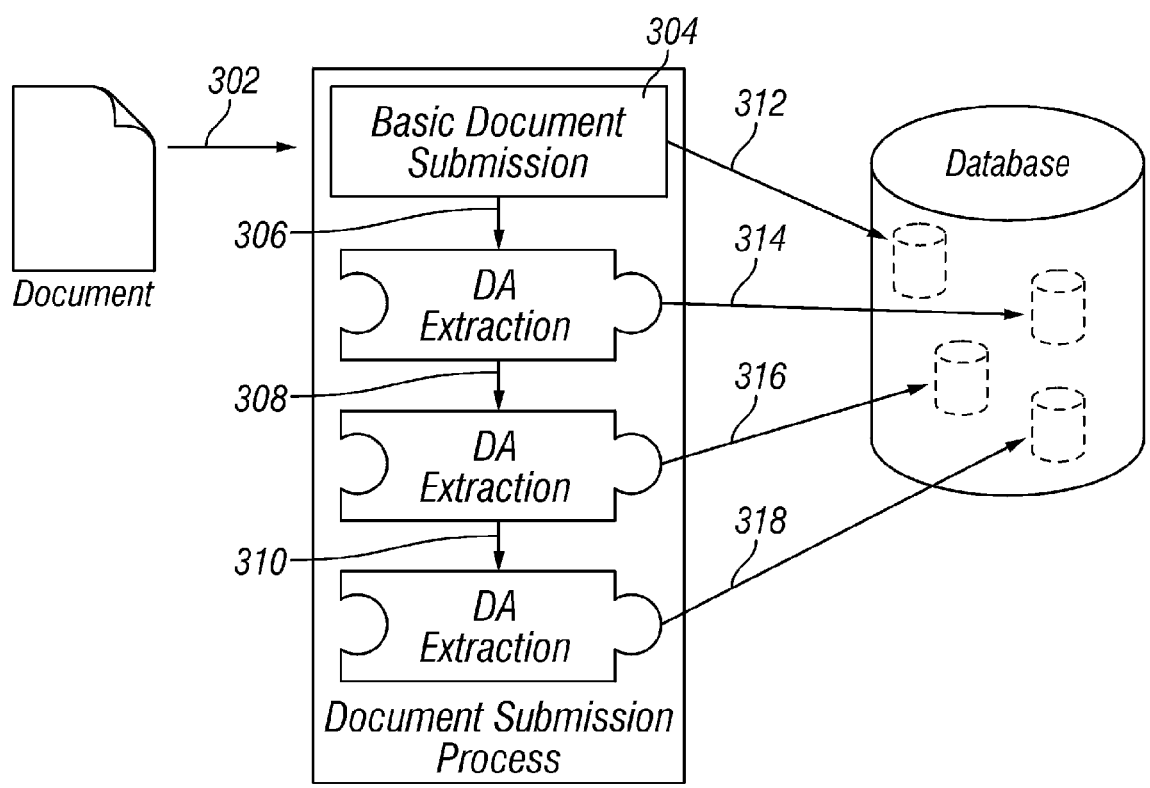
FIG. 3 is a schematic diagram showing a document submission, extraction, and storage process according to the invention.

A document submission, extraction, and storage process is described with reference to FIG. 3. A document is submitted to the host server 302. Once the basic submission is complete 304, the document is processed in turn by each appropriate Document Aspect module (306, 308, and 310). Each module places its extracted data into the common database (312, 314, 316, and 318).

An Exemplary Descriptor XML

In one embodiment of the invention, each Document Aspect is partially defined by a descriptor, which is an XML document that specifies how and when the DA's code module is to be invoked, what format its output data has, how that data are to be displayed to the user, and how the user can interact with the data. It should be appreciated that the specific details described hereinbelow are by way of example only and are not meant to be limiting.

It should be appreciated that a Document Aspect Descriptor can also be encoded as a suite of key-value pairs, as a Java TreeMap object, or as some other Java object whose methods can be called to extract the descriptive data, as well as in other ways. XML is convenient for such task but not the only implementation.

Sample XML

Following is a sample descriptor document:

```
<document-aspect
    id='lol'
    name='List of Links'
    short-label='LOL'
    invocation='submission'
    spider='on-request'
    filetypes='pdf'
    version='1'
    type='hier'>
        <on-open col='1' action='open-url' />
        <on-open col='2' action='show-page' />
        <on-open col='3' action='open-url' />
</document-aspect>
```

Descriptor XML in Detail

This section describes the descriptor XML document in detail.

Overview.

A Document Aspect is described by several values such as its name, label, filetypes handled, and so on. Such values are encoded as attributes of the top-level <document-aspect> tag. In addition the semantics of the data extracted by the Document Aspect, as delivered to the client, are described by a list of <on-open> tags whose contents specify the actions that the client should take if the user attempts to open a list item or list item field in the client's UI display.

The Document-aspect Tag.

The <document-aspect> tag is the top-level tag. Its attributes specify global attributes of the DA.

The attributes of the <document-aspect> tag are:

id—the unique identifier for the Document Aspect.
name—the name of the Document Aspect.
short-label—an abbreviation of the name, suitable for display on tabs and small buttons.
invocation—a specification of when the module should be run for individual documents. Possible values include "submission" (run on single documents when they are submitted) and "on-request" (run only when the server receives a request to do so).
spider—an optional specification of when the module should be allowed to spider and process the repository. Possible values include "on-request" (run only when the server receives a request to do so), "on-index" (run only when the server has finished re-indexing a portion of the repository, and only spider that portion), and a time-interval specification to trigger periodic spidering of the entire repository.
filetypes—a list of the file types that the DA can handle, for example pdf.
version—a version stamp which can be incremented should any serious changes be made to the Document Aspect framework.
type—the overall format of the data of this Document Aspect. Possible values include 'list', 'outline', 'table' and 'rich-text'.

The contents of the <document-aspect> tag are a list of <on-open> tags specifying default actions to be taken by the client when the user attempts to open an item or item field in the client's UI display. The list of <on-open> tags is passed to the client along with the instance data when the client requests instance data for the Document Aspect. It should be appreciated that these default actions can be overridden by other action specifications embedded within a data instance's items; see sections hereinbelow.

The On-open Tag.

The <on-open> tag specifies the default action that a client is to take when the user, in whatever fashion is appropriate to the client such as double-clicking, indicates that a list item or a field of a list item is to be opened. Each tag specifies a column index, indicating a particular field of a potentially multi-field entry, and an action to be taken when that field of any item is opened.

In the example given above, the first and third columns open a URL in a new Web browser window; the second column displays a page from the current document.

The <on-open> tag has the following attributes:

col—This attribute specifies the index number of a column. Columns are numbered from left to right starting with column 1. A value of zero indicates that the tag applies to any column which does not have an <on-open> tag of its own.
action—This attribute specifies the action to take when an item is opened. Possible values include open-url, show-page, and open-document.

As will be seen in hereinbelow for the <item> tag, list items can have attributes that specify a URL, a page number within the current document, or a document available from a local or remote document server. These values are used when an item is opened. If the action is open-url, the item's URL is the one that is displayed. If the action is show-page, the item's page-number in the current document is the page that is displayed. If the action is show-document, the document specified by the item's document-id is displayed. And, if the item also specifies a page number, that page of the specified document is the page initially displayed.

It should be appreciated that these default actions may be overridden by other action specifications embedded within a data instance's items; see sections hereinbelow.

An Exemplary Data XML

This section describes an exemplary data XML document in detail. Similarly as for Descriptor XML described hereinabove, Document Aspect Data can also be encoded as a suite of key-value pairs, as a Java TreeMap object, or as some other Java object whose methods can be called to extract the data, as well as in other ways. XML is a convenient implementation for this task but not meant to be limiting. It should also be appreciated that all details hereinbelow are meant by way of example only and are not meant to be limiting.

Sample XML

```
<document-aspect
    id='lol'
    name='List of Links'
    short-label='LOL'
    version='1'
    type='list'>
        <on-open col='1' action='open-url' />
        <on-open col='2' action='show-page' />
        <on-open col='3' action='open-url' />
        <item page='27' url='http://www.google.com'>
            <field value='Google' />
            <field value ='27' type='number' />
            <field value ='A fine way to search the Web' />
        </item>
        <item page='27' url='http://www.semicolon.com'>
            <field value ='Semicolon Software' />
            <field value ='27' type='number' />
            <field value ='Time-wasters of great potency' />
        </item>
        <item page='29' url='http://www.adobe.com'>
            <field value ='Adobe Systems' />
            <field value ='29' type='number' />
            <field value ='The source for PDF readers' />
```

```
        </item>
    </document-aspect>
```

Data XML in Detail

This section describes the data XML document in detail.

Overview.

A Document Aspect is described by several values such as its name, label, the overall structure of the data, e.g. flat list or hierarchy, and so on. Such values are encoded as attributes of the top-level <document-aspect> tag. The data encapsulated by a Document Aspect for a particular document is represented as a list, flat or hierarchical, of entries. The contents of the <document-aspect> tag are a series of <on-open> tags describing what happens if the user opens a list entry or a specified portion of a list entry, and <item> tags describing the contents of the list.

The Document-aspect Tag.

The <document-aspect> tag is the top-level tag. Its attributes specify global attributes of the DA.

The attributes of the <document-aspect> tag are:

id—the unique identifier for the Document Aspect.

name—the display name of the Document Aspect.

short-label—an abbreviation of the name, suitable for display on tabs and small buttons.

version—a number indicating the format version of the XML-encoded data.

type—a specifier indicating whether the encapsulated data has the form of a flat list or a hierarchical list.

The contents of the <document-aspect> tag are one or more <on-open> tags and zero or more <item> tags.

The On-open Tag.

The <on-open> tag specifies the action that a client is to take when the user, in whatever fashion is appropriate to the client, such as double-clicking, indicates that a list item or a field of a list item is to be opened. Each tag specifies a column index indicating a particular field of a potentially multi-field entry and an action to be taken when that field of any item is opened.

In the example given above, the first and third columns open a URL in a new Web browser window; the second column displays a page from the current document.

The <on-open> tag has the following attributes:

col—This attribute specifies the index number of a column. Columns are numbered from left to right starting with column 1. A value of zero indicates that the tag applies to any column which does not have an <on-open> tag of its own.

action—This attribute specifies the action to take when an item is opened. Possible values include open-url, show-page, and open-document.

As can be seen in the section hereinbelow on the <item> tag, list items can have attributes that specify a URL, a page number within the current document, or a document available from a local or remote document server. These values are used when an item is opened. If the action is open-url, the item's URL is the one that is displayed. If the action is show-page, the item's page-number in the current document is the page that is displayed. If the action is show-document, the document specified by the item's document-id is displayed and if the item also specifies a page number, that page of the specified document is the page initially displayed.

The Item Tag.

The <item> tag specifies the contents of a single item in the list. An item can contain multiple fields, each with its own value, and indexed by column index starting at 1. Clients may display each item on a single line, and display the fields left-to-right in column-index order, although this is not required. Fields are encoded as <field> tags that are children of the <item> tag.

In addition to its fields, whose values are displayed to the user, an item may have values which are not displayed but which are used when the user attempts to open the item or one of its fields. These values are encoded as attributes of the <item> tag.

The <item> tag has the following attributes:

page—The page number to be displayed, either in the current document, if the action is show-page, or the specified document, if the action is open-document.

doc-id—The ebrary document-id of the document to be displayed if the action is open-document.

url—The URL to be opened in a Web browser if the action is open-url.

An <item> tag may also contain a list of child <item> tags, if it is part of a hierarchical list.

The Field Tag.

The <field> tag specifies the display value of one field in a list item. It may also optionally contain the same attributes as an <item> tag. If any of these attributes are present, their values apply only to the field and override the values specified in the parent <item> tag.

The <field> tag has the following attributes:

value—the value to be displayed for the field.

type—either text, number, or image; if absent, text is assumed. The value, number, is a hint to the client to sort this field numerically. If the value of the type attribute is image, then the value of the value attribute is treated as a URL to an image to be downloaded and displayed.

page—The page number to be displayed, either in the current document, if the action is show-page, or the specified document, if the action is open-document.

doc-id—The ebrary document-id of the document to be displayed if the action is open-document.

url—The URL to be opened in a Web browser if the action is open-url.

If the display value of a <field> tag is too large or complex to encode as the value of an attribute, the value attribute may be omitted and replaced by the contents of the <field> tag. The attribute form is recommended whenever possible.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for searching, browsing, presenting, and interacting with data assembled from contents of at least one document, comprising:

for a document aspect comprising a portion of said document's contents in user viewable form, where said portion is all and only those parts of said at least one document that have something semantically useful in common, and for one or more predetermined document aspect types within said at least one document, performing the following steps:

extracting from said at least one document one or more user viewable objects related to said predetermined type in accordance with said document aspect to yield a document aspect instance;

storing said document aspect instance extracted from said at least one document in connection with a user viewable assembled collection in a repository for a subsequent use; and when said document aspect instance is accessed, providing said assembled collection to a user;

wherein a document aspect provides finer granularity in search results for a search that finds terms within multiple articles in a document contained within a collection, in which case such search results are displayed hierarchically as collections at a top level, with lists of documents within each collection, and with lists of articles within the documents, and wherein granularity is extendable to a page level, displaying a list of pages under each article, and for each page showing two or more words of context surrounding an occurrence of a search term.

2. The method of claim 1, further comprising the step of:
post-processing said assembled collection by any of or any combination of searching, browsing, presenting, and interacting.

3. The method of claim 1, wherein an extracted object comprises either of or the combination of:
a portion of said document's contents and relevant metadata obtained from sources other than the document's contents.

4. The method of claim 1, said extracting step further comprising the step of:
formatting said one or more extracted objects and storing said one or more formatted extracted objects.

5. The method of claim 1, wherein a new predetermined type and said extracting and storing steps can be added as a piece of server plug-in software, such that a client recognizes and presents said assembled collection without need for client upgrades or plug-ins.

6. The method of claim 1, wherein said extracting and storing steps are performed responsive to a trigger event.

7. The method of claim 6, wherein a trigger event is any of: document submission, periodic spidering, administrator request, and user request via a servlet.

8. The method of claim 1, wherein said repository is a server's collection of per-document data stored in a hierarchy of files on a hard disk.

9. The method of claim 1, wherein said stored collection is a cross-document collection, formed from a union of collections of multiple documents.

10. The method of claim 1, wherein said stored collection of extracted objects is associated with a user.

11. The method of claim 1, wherein said extracting step uses heuristic techniques to identify objects of said predetermined type.

12. The method of claim 1, wherein said extracting and storing steps are encapsulated in a self-contained jar.

13. The method of claim 1, wherein said assembled collection comprises one or more collections hierarchically.

14. The method of claim 1, wherein when said document is accessed, further comprising the step of:
requesting available collections for presenting.

15. A system for searching, browsing, presenting, and interacting with data assembled from contents of at least one document, comprising:
for a document aspect comprising a portion of said document's contents in user viewable form, where said portion is all and only those parts of said at least one document that have something semantically useful in common, and for one or more predetermined types within said at least one document, means for performing the following:
extracting from said at least one document one or more user viewable objects related to said predetermined type in accordance with said document aspect to yield a document aspect instance;
storing said document aspect instance extracted from said at least one document in connection with a user viewable assembled collection in a repository for a subsequent use;
when said document aspect instance is accessed, means for providing said assembled collection to a user;
wherein a document aspect provides finer granularity in search results for a search that finds terms within multiple articles in a document contained within a collection, in which case such search results are displayed hierarchically as collections at a top level, with lists of documents within each collection, and with lists of articles within the documents, and
wherein granularity is extendable to a page level, displaying a list of pages under each article, and for each page showing two or more words of context surrounding an occurrence of a search term; and
wherein the means for performing includes a computer processor.

16. The system of claim 15, further comprising:
means for post-processing said assembled collection by any of or any combination of searching, browsing, presenting, and interacting.

17. The system of claim 15, wherein an extracted object comprises either of or the combination of:
a portion of said document's contents and relevant metadata obtained from sources other than the document's contents.

18. The system of claim 15, said means for extracting further comprising:
means for formatting said one or more extracted objects and means for storing said one or more formatted extracted objects.

19. The system of claim 15, wherein a new predetermined type and said associated extracting and storing steps can be added as a piece of server plug-in software, such that a client recognizes and presents said associated collection without need for client upgrades or plug-ins.

20. The system of claim 15, wherein said extracting and storing steps are performed responsive to a trigger event.

21. The system of claim 20, wherein a trigger event is any of:
document submission, periodic spidering, administrator request, and user request via a servlet.

22. The system of claim 15, wherein said repository is a server's collection of per-document data stored in a hierarchy of files on a hard disk.

23. The system of claim 15, wherein said stored collection is a cross-document collection, formed from a union of collections of multiple documents.

24. The system of claim 15, wherein said stored collection of extracted objects is associated with a user.

25. The system of claim 15, wherein said means for extracting uses heuristic techniques to identify objects of said predetermined type.

26. The system of claim 15, wherein said means for extracting and storing are encapsulated in a self-contained jar.

27. The system of claim 15, wherein said one or more collections comprises one or more collections hierarchically.

28. The system of claim 15, wherein when said document is accessed, further comprising:

means for requesting available collections for presenting.

29. The method of claim 1, wherein a document aspect is described by values that comprise its name, label, and an overall structure of data;

wherein said values are encoded as attributes of a top-level <document-aspect>tag; and wherein data encapsulated by a document aspect for a particular document is represented as a list, flat or hierarchical, of entries.

30. The system of claim 15, wherein a document aspect is described by values that comprise its name, label, and an overall structure of data;

wherein said values are encoded as attributes of a top-level <document-aspect>tag; and wherein data encapsulated by a document aspect for a particular document is represented as a list, flat or hierarchical, of entries.

* * * * *